3,098,868
AMINE SALTS OF GLYCURONIC ACID
Luigi Rovati, Milan, Italy, assignor to Rotta Research Laboratorium S.p.A., Milan, Italy
No Drawing. Filed Sept. 12, 1960, Ser. No. 55,153
3 Claims. (Cl. 260—501)

The numerous therapeutical properties of glycuronic acid are known. This acid is normally present in living organs and is utilised inter alia by the liver for protective synthesis.

The purpose of this invention is to implement the activity of said acid both in a hepatoprotective and detoxifying as well as hypocholesterolizing direction, in order to obtain a product which can be efficiently used in human therapy.

According to this invention the abovementioned purpose is fulfilled by the salt formed from glycuronic acid and an amine selected from the group consisting of betaine $$(CH_3)_3 \overset{+}{N} CH_2 C \overset{-}{O} \overset{}{O}$$

and diethanolamine ($HN$—$(CH_2CH_2OH)_2$), said salt being of the general formula $$CHO—(CH—OH)_4—COOR$$

wherein:
$R = -N(CH_3)_3CH_2COOH$ or
$R = -NH(CH_2CH_2OH)_2$

The two salts mentioned above shall be briefly referred to hereinafter as betaine glycuronate and diethanolamine glycuronate, respectively.

Betaine and diethanolamine considered each per se are normally utilised by the organism for the synthesis of phospholipides which represent the dynamic force of lipides, thereby avoiding accumulation thereof in the liver and blood plasma.

Experimental work carried out on laboratory animals however disclosed that the useful properties of the two glycuronates according to this invention largely go beyond any expectation based on the properties of the single components, as shown by the following Tables I and II.

It will be seen from Table I that the substances according to this invention are of much lower toxicity than their starting bases with respect to which they are two to six times less toxic. Table II shows inter alia that in experimental steatosis diethanolamine glycuronate and betaine glycuronate are more active than methionine as lipotropic agents.

TABLE I

[$LD_{50}$ in white-mouse by intravenous injection in mg./kg. (statistical calculation according to Lichtfield and Wilcoxon, J. Pharm. Exp. Ther., 96, 99, 1949)]

| Compounds | Number of animals | $LD_{50}$, mg./kg. | Confidential limits with $P=0.05$ | | Slope of curve |
|---|---|---|---|---|---|
| Betaine base | 20 | 3,500 | 4,720 | 2,590 | 1.65 |
| Betaine glycuronate | 20 | 5,700 | 6,330 | 5,130 | 1.16 |
| Diethanolamine | 20 | 600 | 702 | 512 | 1.20 |
| Diethanolamine glycuronate | 20 | 3,600 | 3,920 | 330 | 1.13 |
| Glycuronic acid | 20 | >4,000 | | | |

TABLE II

[Handler's Hyperlipidic diet of rat. Therapeutical actions of the instant compounds]

| Compounds | Dose, mg./kg. per os | Number of animals | Serum cholesterol | | | Liver | | Average daily consumed diet, percent body weight | Body weight | |
|---|---|---|---|---|---|---|---|---|---|---|
| | | | total | esterif. | esterif. index | liver weight, percent of final body weight | total fats, percent of fresh weight | | at the start | average variation on 28th |
| Betaine glycuronate | 600 | 8 | 87.7 | 66.0 | 75.8 | 5.8 | 4.27 | 3.5 | 165 | −15 |
| Diethanolamine glycuronate | 300 | 8 | 70.1 | 47.0 | 67.0 | 5.2 | 3.70 | 4.3 | 155 | −14 |
| Methionine | 600 | 10 | 78.5 | 55.4 | 70.0 | 5.0 | 6.42 | 4.1 | 206 | −34 |
| Checks with Handler's diet | | 10 | 72.0 | 52.0 | 71.0 | 3.4 | 9.49 | 3.9 | 317 | −29 |
| Checks with standard diet | | 8 | 45.1 | 41.3 | 88.0 | 4.2 | 2.59 | | 234 | −9 |

Glycuronates according to this invention are prepared by reacting in the hot in a liquid medium glycuronlactone and the corresponding amine. Glycuronlactone is preferably dissolved in water or ethyl alcohol and pre-heated to its reaction temperature; the same is done with the amine, whereupon both components are contacted with each other by pouring the amine solution at a controlled rate into the glycuronlactone solution while steadily stirring and checking temperature.

Further details of the process and chemico-physical properties of the instant glycuronates shall appear from the following two examples.

Example 1

I fill into a Pyrex 15-liters flask having three lateral necks equipped with a stirrer, plunger thermometer and valved funnel 1,400 gr. glycuronlactone crystals and 5,500 cc. distilled water.

I separately prepare a solution of 770 gr. birectified diethanolamine in 3,000 cc. distilled water and heat on a water-bath till the glycuronlactone is thoroughly dissolved. The temperature should not exceed 65° C. I then start pouring the diethanolamine solution by drops, discontinuing whenever the pH becomes 6½ to 6¾ and resuming when the pH becomes about 6. Temperature should be around 65° and not exceed 70° during the whole period of this operation. The time required is about 6 hrs.

The straw color of the salt being formed will become apparent, the coloring becoming steadily more intense.

Towards the end the rate of diethanolamine supply should be decreased to prevent the pH from exceeding about 6¾. The solution is allowed to cool and is then filtered on active coal by means of a Büchner filter.

The resulting solution is straw-colored, clear, refracting, its total weight being about 10.670 gr.

The solution is placed in a 10-liters Claisen in two steps and concentrated in vacuum on a water-bath at a temperature not exceeding 45° C.

The Claisen should be previously weighed and concentration shall be discontinued on reaching a net weight of 4,360 gr. The resulting solution is 50% by weight diethanolamine glycuronate referred to the weight of the diethanolamine employed which is slightly below the theoretical value to avoid the final pH from exceeding 6.

The solution is again filtered by means of active coal and is at the end yellow, clear and refracting.

When it is desired to prepare tablets from the solution, concentration shall be carried on to 55% by weight.

Diethanolamine glycuronate is of a molecular weight of 299.35 and comprises a viscous straw-colored mass which cannot be converted to crystals. Its centesimal composition is as follows:

C, percent _____ 40.3
H, percent _____ 7.02
O, percent _____ 48
N, percent _____ 4.68

*Example 2*

I fill into a Pyrex 15-liters flask with 3 lateral necks having a stirrer, reflux cooler, thermometer, valved funnel and water-bath 7,500 cc. 95% ethyl alcohol and 1,000 gr. glycuronlactone and heat on a water-bath to a temperature of about 78° or boiling temperature. The glycuronlactone dissolves. I separately prepare an alcohol solution of 665 gr. betaine base and 4,500 gr. pure 95% ethyl alcohol which has been previously heated to about 70°–75° C.

The alcoholic betaine solution is supplied at high rate through the valved funnel in about 5 minutes, while steadily stirring. A solution is formed and a slightly exothermic reaction takes place. Stirring and reflux heating are pursued till the mass is thoroughly dissolved and clear.

Characteristic white crystals are at times formed when the temperature is below 75° C. The solution should in any case be completed. The period required is about 1 hr. to 1 hr. 15 minutes, the two solutions being heated during about 30 to 45 minutes.

The solution is thereupon quickly filtered on charcoal by using a heated Büchner filter and collecting bowl. The colorless clear solution is placed in a cristallyser and left overnight. The next morning the white rather hard and compact crystals are filtered, pressed on a filter, washed with a little alcohol, dried in an oven at 65° (constant weight). 1,200 to 1,250 gr. betaine glycuronate are obtained in the form of hard white crystals similar in aspect to sugar, soluble in boiling alcohol, highly soluble in water with a neutral pH. The aqueous solution slowly hydrolises in the cold, more quickly in the hot, the pH sinking below 3.

The recovery of alcohol should be effected on a water-bath under a slight vacuum to maintain a temperature around 40°–50° C. in the bath. Otherwise the product left in a dissolved state is altered and alcohol has a trimethylamine smell and can no longer be used for the next preparation.

Betaine glycuronate is of a molecular weight of 293,272 and melting point of 152°–153° C., its centesimal composition being as follows:

C, percent _____ 45.0
H, percent _____ 6.479
O, percent _____ 43.65
N, percent _____ 4.77

The product is in the form of a white, finely divided highly hygroscopic powder.

The above description clearly shows to the expert that the instant glycuronates are suitable for the formulation of medicinal preparations in a liquid, tablet or powder form according to requirements, formulation merely requiring a suitable excipient or solvent. Diethanolamine glycuronate obtained according to Example 1 can be mixed with starch for instance and pressed to tablets or diluted with distilled water and packed in phials. Betaine glycuronate is conveniently packed according to experience from Example 2 in the form of crystals or powder. However, liquid preparations can easily be prepared, betaine glycuronate being readily soluble in water. It should therefore be understood that therapeutical preparations in either liquid, powder or tablet form containing the above described glycuronates fall within the scope of this invention.

What I claim is:
1. Glycuronic acid salts of the general formula

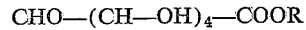

$$CHO-(CH-OH)_4-COOR$$

wherein R is a radical selected from the group consisting of $N(CH_3)_3CH_2COOH$ and $NH(CH_2CH_2OH)_2$.

2. Betaine glycuronate of the formula

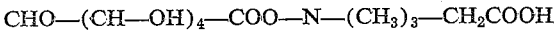

$$CHO-(CH-OH)_4-COO-N-(CH_3)_3-CH_2COOH$$

and having a melting point of 152 to 153° C.

3. Diethanolamine glycuronate of the formula

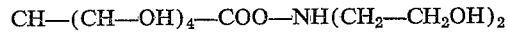

$$CH-(CH-OH)_4-COO-NH(CH_2-CH_2OH)_2$$

References Cited in the file of this patent

UNITED STATES PATENTS

| | | |
|---|---|---|
| 2,283,817 | Martin et al. | May 19, 1942 |
| 2,449,987 | Gresham | Sept. 28, 1948 |
| 2,681,352 | Hach et al. | June 15, 1954 |
| 2,773,852 | Rowe et al. | Dec. 11, 1956 |
| 2,794,045 | Beaufour et al. | May 28, 1957 |
| 3,002,886 | Halpern | Oct. 3, 1961 |
| 3,028,420 | Petrow et al. | Apr. 3, 1962 |

FOREIGN PATENTS

| | | |
|---|---|---|
| 295,024 | Great Britain | Jan. 27, 1930 |

OTHER REFERENCES

Sano et al.: Chem. Abst., vol. 52 (1958), column 20211.
Ehrlich et al.: Ber. Deut. Chem., vol. 62 (1929), pages 628–633.
Clarkson et al.: Proc. Soc. Exptl. Biol. and Med., March 1959, pages 525, 526.
Clarkson et al.: Arch. Int. Pharmacodyn., 1959, CXVIII, No. 3–4, pages 274–277.